(12) United States Patent
Kim et al.

(10) Patent No.: US 9,338,271 B2
(45) Date of Patent: May 10, 2016

(54) MOBILE TERMINAL AND METHOD FORMING CASE OF THE SAME

(71) Applicant: LG Electronics Inc., Seoul (KR)

(72) Inventors: Sunghan Kim, Seoul (KR); Inseok Yoo, Seoul (KR); Taehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 14/269,940

(22) Filed: May 5, 2014

(65) Prior Publication Data

US 2015/0141084 A1     May 21, 2015

(30) Foreign Application Priority Data

Nov. 21, 2013   (KR) .................. 10-2013-0142385

(51) Int. Cl.
| | |
|---|---|
| *H04M 1/00* | (2006.01) |
| *H04M 1/23* | (2006.01) |
| *H01H 19/58* | (2006.01) |
| *H04M 1/02* | (2006.01) |
| *H01H 13/702* | (2006.01) |

(52) U.S. Cl.
CPC ............. *H04M 1/236* (2013.01); *H01H 13/702* (2013.01); *H01H 19/585* (2013.01); *H04M 1/0202* (2013.01); *H04M 1/0277* (2013.01); *H04M 2250/22* (2013.01); *Y10T 29/49126* (2015.01)

(58) Field of Classification Search
CPC . H04M 1/0202; H04M 1/0277; H04M 1/236; H01H 13/702; H01H 19/585
USPC ............... 455/575.1; 200/302.1, 302.2, 302.3
See application file for complete search history.

(56) References Cited

U.S. PATENT DOCUMENTS

| | | | | |
|---|---|---|---|---|
| 5,564,560 | A | * | 10/1996 | Minelli et al. ................ 200/516 |
| 6,415,165 | B1 | * | 7/2002 | Ishigami ........................ 455/566 |
| 6,681,124 | B2 | * | 1/2004 | Prior et al. .................... 455/563 |
| 9,063,583 | B2 | * | 6/2015 | Kim et al. |
| 2002/0050919 | A1 | * | 5/2002 | Vance .............................. 338/47 |
| 2004/0222970 | A1 | * | 11/2004 | Martinez et al. ............. 345/169 |
| 2006/0007143 | A1 | * | 1/2006 | Davani et al. ................ 345/161 |
| 2007/0246341 | A1 | * | 10/2007 | Kim et al. ..................... 200/5 A |
| 2008/0062015 | A1 | * | 3/2008 | Bowen ............................ 341/22 |
| 2008/0088600 | A1 | * | 4/2008 | Prest et al. .................... 345/173 |
| 2012/0268879 | A1 | * | 10/2012 | Kim et al. ................ 361/679.09 |
| 2013/0329382 | A1 | * | 12/2013 | Jung ............................. 361/749 |
| 2014/0004907 | A1 | * | 1/2014 | Kim et al. ..................... 455/566 |

* cited by examiner

*Primary Examiner* — Duc M Nguyen

(74) *Attorney, Agent, or Firm* — Dentons US LLP

(57) ABSTRACT

A mobile terminal according to the present disclosure includes a terminal main body, a case covering the terminal main body, and forming at least part of appearance of the terminal, wherein the case comprises a penetration line formed through the case along a predetermined path, and forming a connecting portion between ends of the penetration line, and wherein the connecting portion extends from the case, and an input part is formed on a region formed by the penetration line and the connecting portion, the input part being rotatable based on the connecting portion.

28 Claims, 16 Drawing Sheets

MOBILE TERMINAL AND METHOD FORMING CASE OF THE SAME

CROSS-REFERENCE TO RELATED APPLICATION

Pursuant to 35 U.S.C. §119(a), this application claims the benefit of earlier filing date and right of priority to Korean Application No. 10-2013-0142385, filed on Nov. 21, 2013, the contents of which is incorporated by reference herein in its entirety.

BACKGROUND OF THE DISCLOSURE

1. Field of the Disclosure

This specification relates to a mobile terminal and method for forming a case of the mobile terminal, and particularly, to structural improvement of a rear input unit of a mobile terminal.

2. Background of the Disclosure

Terminals may be divided into mobile/portable terminals and stationary terminals according to their mobility. Mobile terminals (mobile device, portable device, portable terminal) can be easily carried and have one or more of functions such as supporting voice and video telephony calls, inputting and/ or outputting information, storing data and the like.

As it becomes multifunctional, a mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions. For example, a user interface environment is provided in order for users to easily and conveniently retrieve or select functions.

Furthermore, as a mobile terminal is considered as a personal belonging for expressing one's own personality, various design forms are required. The design forms include structural changes and improvements for the user to more conveniently use the mobile terminal. As one of the structural changes and improvements, a manipulation unit may be taken into account.

However, regarding a current structure of a rear surface key, button components are present on side and rear surfaces to be clicked or pushed (pressed). Therefore, a separate volume adjustment button may be required in addition to a terminal cover. Therefore, a new type of rear input unit which is capable of address the problem may be considered.

SUMMARY OF THE DISCLOSURE

Therefore, an aspect of the detailed description is to provide a mobile terminal and method for forming a case of the mobile terminal with a rear input unit having a new structure different from the related art.

Another aspect of the detailed description is to provide a structure of preventing sticking caused at the time of pressing a button part.

To achieve these and other advantages and in accordance with the purpose of this specification, as embodied and broadly described herein, there is provided a mobile terminal including a terminal main body, a case covering the terminal main body, and forming at least part of appearance of the terminal, wherein the case comprises a penetration line formed through the case along a predetermined path, and forming a connecting portion between ends of the penetration line, and wherein the connecting portion extends from the case, and an input part is formed on a region formed by the penetration line and the connecting portion, the input part being rotatable based on the connecting portion.

Both ends of the penetration line may be spaced apart from each other, and the penetration line and a line connecting the both ends of the penetration line may form a closed region.

The case may be a window formed on a front surface of the terminal main body or a battery cover formed on a rear surface of the terminal main body.

The case and the input part may be spaced from each other by the penetration line, and the spacing may be gradually increased toward an inner side thereof.

An inclination angle formed between side surfaces of the case and the input part may be in the range of 5° to 10°, and a convex portion may be formed at an end of the input part.

The side surface of the case, facing the end of the input part, may be inclined from the input part to be gradually away therefrom. The input part may be provided with a concave portion recessed into a central portion thereof.

A the mobile terminal may further include a dome switch disposed below the case, and a printed circuit board disposed below the dome switch and electrically connected to the dome switch.

A the mobile terminal may further include a rubber member disposed on a rear surface of the input part and having a pushing protrusion corresponding to the input part. The dome switch may be formed on a flexible printed circuit board, and the mobile terminal may further include a shield can disposed below the flexible printed circuit board and configured to shield electromagnetic interference (EMI) generated from components.

An actuator may be formed on the dome switch, and a protrusion may be formed on a lower surface of the input part to be contactable with the actuator.

The ends of the penetration line may extend toward an inner or outer side of the input part, or toward both of the inner and outer sides of the input part. The ends of the penetration line may be formed in a circular shape.

The mobile terminal may further include a second input part formed by a second penetration line, the second penetration line facing the penetration line and having the same shape as the penetration line, the two penetration lines being spaced apart from each other. A connecting portion may be formed between the ends of the penetration lines to connect the input part and the second input part to each other.

Reinforcing members may be formed on a rear surface of the connecting portion at positions where the two penetration lines are connected. At least one rib may be formed around the rear surface of the connecting portion.

Ribs may be formed between the rear surface of the connecting portion and the protrusion formed on the lower surface of the input part.

The mobile terminal may further include a power button part disposed between the input part and the second input part, and exposed to a rear surface of the terminal main body. A first light source may be provided at one side below the input part to emit light to an edge of the power button part.

A second light source may be provided below the input part and the second input part, and a light guide may be disposed at one side of the second light source, such that light is emitted to edges of the input part and the second input part.

The penetration line may be a penetration line in an 'L-like' shape formed along an edge of the case, and the penetration line may include a first portion formed from the edge of the case toward an inner side of the case, and a second portion extending from the first portion and having an uneven interval from a side surface of the case.

The input part may include an upper input portion and a lower input portion formed by a first penetration line and a second penetration line, respectively. The second portions of the first penetration line and the second penetration line may be spaced apart from each other.

In accordance with one exemplary embodiment disclosed herein, there is provided a mobile terminal including a terminal main body, a case covering the terminal main body and forming at least part of an appearance of the terminal, a flexible printed circuit board disposed below the case and having a dome switch, and a printed circuit board disposed below the flexible printed circuit board and electrically connected to the flexible printed circuit board. Here, the case may be provided with a penetration line formed through a partial area thereof to form a boundary, and the penetration line may define an input part. The dome switch may be pressed in response to the input part being pressed.

In accordance with one exemplary embodiment disclosed herein, there is provided a mobile terminal including a terminal main body, and a case covering the terminal main body and forming at least part of an appearance of the terminal. A partition line may be formed through the case and convex along one direction. The partition line may have both ends spaced apart from each other. An input part may be formed on an inner region of the partition line. The input part may be integrally formed with the case by a connection portion formed between both ends of the partition line. The input part may be rotatable based on the connecting portion.

In accordance with one exemplary embodiment disclosed herein, there is provided a mobile terminal including a terminal main body, and a case covering the terminal main body and forming at least part of an appearance of the terminal. The case may be divided into a first region formed by a partition line penetrating through the case and a line connecting both ends of the partition line, and a second region adjacent to the first region. The case may be provided with a connecting portion formed between the both ends of the partition lines, and an input part may be formed on the first region. The input part may be rotatable based on the connecting portion.

In accordance with one exemplary embodiment disclosed herein, there is provided a mobile terminal including a terminal main body, and a case covering the terminal main body and forming at least part of an appearance of the terminal. The case may be provided with a partition line formed through the case along a predetermined path. An input part may be formed on a region formed by the partition line and a connecting portion formed between both ends of the partition line. The input part may be rotatable based on the connecting portion.

To achieve these and other advantages and in accordance with the purpose of this specification, as embodied and broadly described herein, there is provided a method for forming a case of a mobile terminal, the method including forming an input part in a manner of irradiating laser beam onto a case along a predetermined path, the case covering a terminal main body and forming at least part of appearance of the terminal, and coupling the case to the terminal body. Here, the coupling step may be configured in such a manner that a flexible printed circuit board having a dome switch is formed below the case, and is electrically connected to a printed circuit board.

The forming of the input part may be carried out in a manner of irradiating the laser beam from an inner side of the case by more than two times.

Surfaces of the case and the input part, facing each other, may gradually get away from each other toward the inner side, by the irradiation of the laser beam. The laser beam may be irradiated in a manner that ends of the path is formed into a circular shape.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, a mobile terminal associated with the present disclosure will be described in more detail with reference to the accompanying drawings. Hereinafter, suffixes "module" and "unit or portion" for components used herein in description are merely provided only for facilitation of preparing this specification, and thus they are not granted a specific meaning or function.

A mobile terminal disclosed herein may include a laptop computer, a tablet PC, a mobile phone, a smart phone, a digital broadcast terminal, a personal digital assistant (PDA), a portable multimedia player (PMP), a navigator, and the like.

Figure 1:
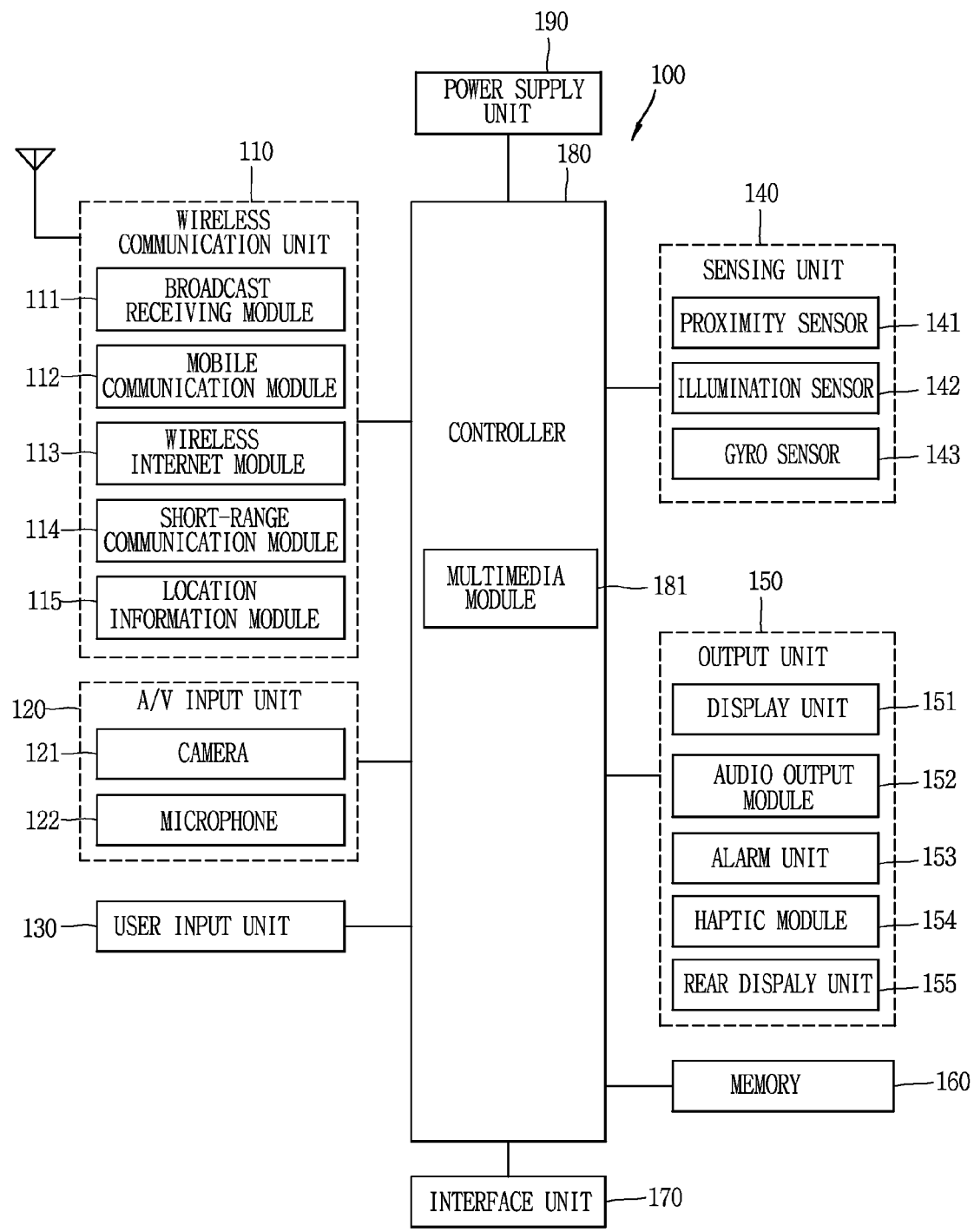
FIG. 1 is a block diagram of a mobile terminal in accordance with one exemplary embodiment disclosed herein.

FIG. 1 is a block diagram of a mobile terminal in accordance with one exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a front display unit 151 and/or a rear display unit 155.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The front display unit 151 may display (output) information processed in the mobile terminal 100. For example, when the mobile terminal 100 is in a phone call mode, the front display unit 151 may display a User Interface (UI) or a Graphic User Interface (GUI) associated with a call. When the mobile terminal 100 is in a video call mode or image capturing mode, the front display unit 151 may display a captured image and/or received image, a UI or GUI.

The front display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the front display unit 151 of the terminal body.

The front display unit 151 may be implemented in two or more in number according to a configured aspect of the mobile terminal 100. For instance, a plurality of display modules may be arranged on one surface to be spaced apart from or integrated with each other, or may be arranged on different surfaces.

In embodiments where the front display unit 151 and a touch sensitive sensor (referred to as 'touch sensor') have an interlayer structure, the structure may be referred to as a 'touch screen'. The front display unit 151 may be used as an input device in addition to being used as an output device. The touch sensor may be implemented as a touch film, a touch sheet, a touch pad, and the like.

The touch sensor may be configured to convert changes of a pressure applied to a specific part of the front display unit 151, or a capacitance occurring from a specific part of the front display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the front display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The rear surface of the mobile terminal 100 may be shown, having a rear display unit 155 corresponding to the front display unit 151. The rear display unit 155 may have a smaller size than the front display unit 151, and display relatively simple information.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Explaining the user input unit 130 again, the user input unit 130 according to the present disclosure may be disposed on the rear surface of the terminal so as to implement the front display into a larger screen. Hereinafter, description will be given in more detail, of a detailed structure that the user input unit 130 is disposed on the rear surface and operations implemented thereby.

Figure 2A:
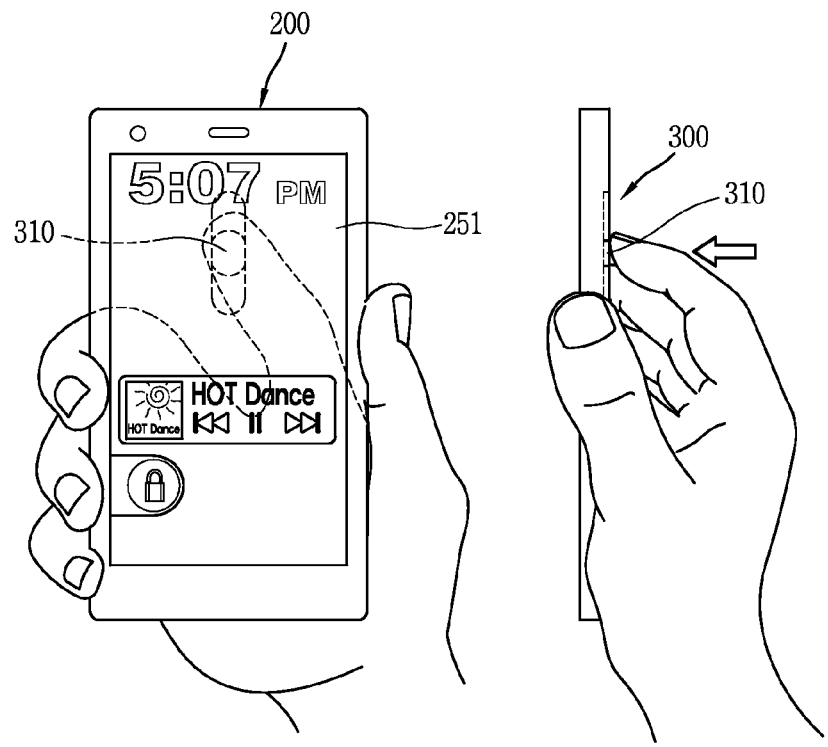
FIGS. 2A and 2B are conceptual views illustrating operations implemented according to one exemplary embodiment disclosed herein.
Figure 2B:
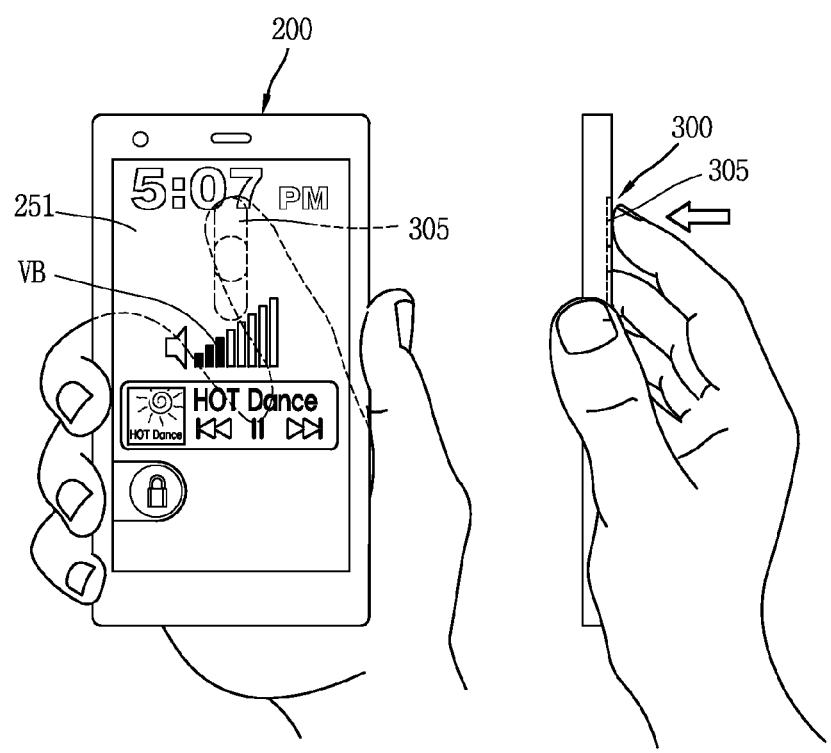

FIGS. 2A and 2B are conceptual views illustrating operations implemented by the present disclosure.

As illustrated in FIG. 2A, the terminal may include a display module 251 disposed on one surface of a main body, for example, on a front surface. The display module 251 may output a graphic user interface (GUI) of an application which is being currently executed. The display module 251 may include a touch sensor to sense a touch input onto the GUI. The display module 251 may output, together with the GUI, visual information implemented in form of an image, text, an icon and the like, or be switched (converted) into an inactive (deactivated) state after the lapse of a preset time or in response to an input of a predetermined control command. FIG. 2A illustrates this state, namely, a state that the display module 251 is deactivated while a music-play application is executed.

A rear input unit 300 may be disposed on another surface of the main body, for example, on a rear surface. The rear input unit 300 may receive a control command with respect to the display module 251. In more detail, when a push input is applied to a button part 310 of the rear input unit 300, the display module 251 may be converted into an inactive state. That is, the button part 310 may be a power key for turning on or off the display module 251. Therefore, the power-on or power-off of the terminal can be executed by the button part 310. As illustrated, a GUI of a music-play application may be output as the display module 251 is activated.

Referring to FIG. 2B, when a push input is applied to a input part 305 which is another button of the rear input unit 300 in the state of FIG. 2A, a volume bar (VB) may be output so as to allow for a volume adjustment by a manipulation of the input part 305. Here, the present disclosure may not be limited to this. The push input with respect to the input part 305 of the rear input unit 300 may be an input for the volume adjustment in the state of FIG. 2A.

According to the example, a user may input a control command in a pushing manner into the rear surface of the terminal while viewing the display module 251. Consequently, the rear input unit 300 of the rear surface of the terminal may be configured to receive the push input, and in some cases, may serve as a power key and a volume key of the terminal.

Figure 3A:
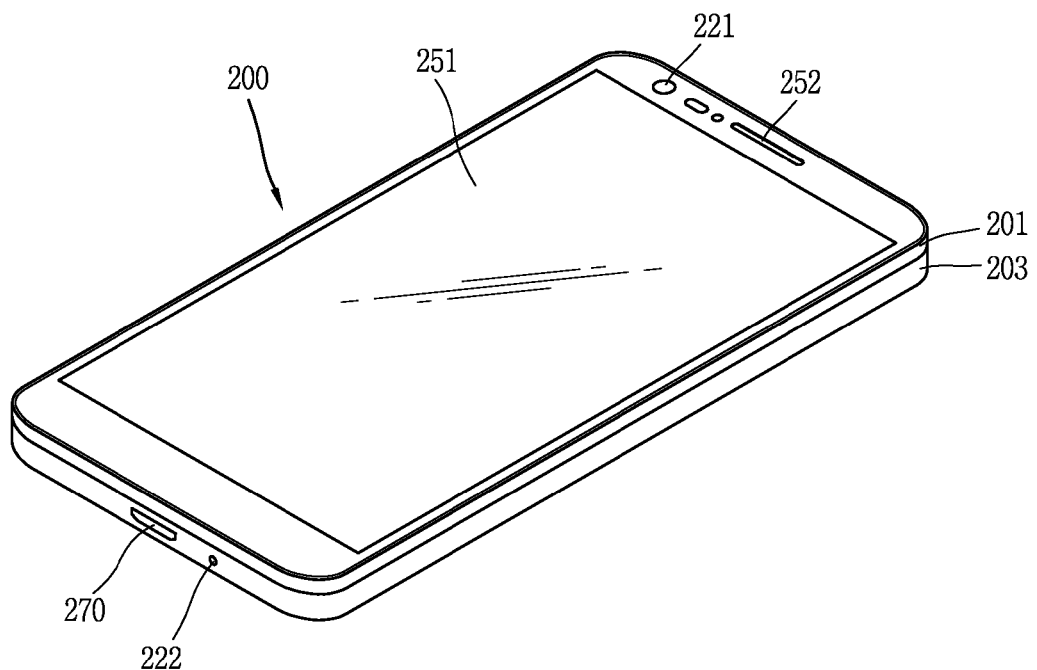
FIG. 3A is a front perspective view of a mobile terminal in accordance with one exemplary embodiment disclosed herein.
Figure 3B:
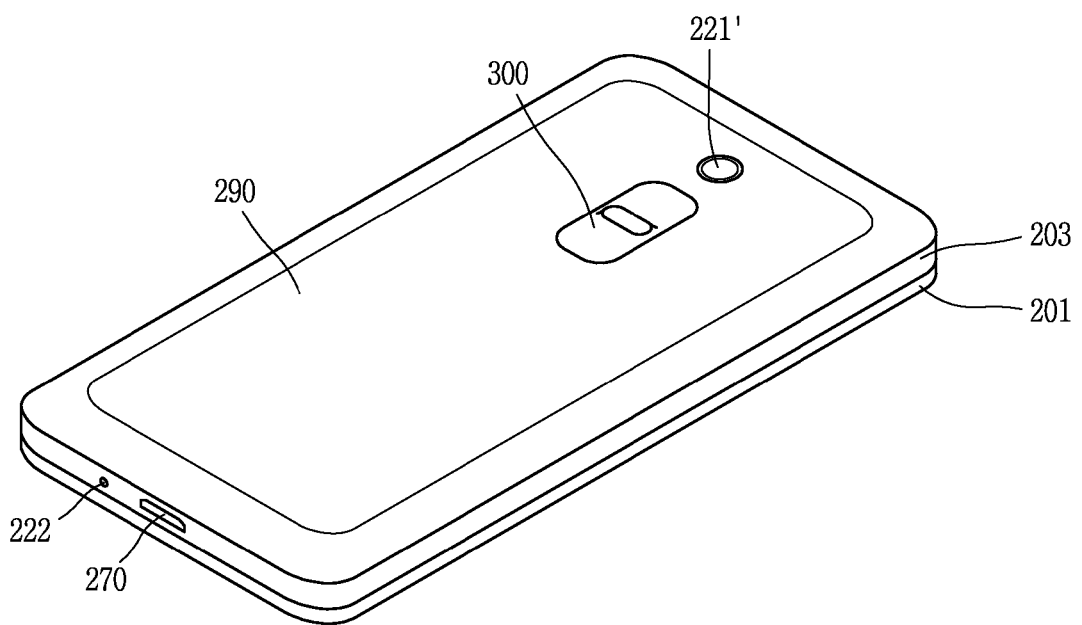
FIG. 3B is a rear perspective view of the mobile terminal illustrated in FIG. 3A.

Hereinafter, hardware configuration of the terminal executing the operations illustrated in FIGS. 2A and 2B will be described in more detail. FIG. 3A is a front perspective view of an example of a mobile terminal in accordance with the present disclosure, and FIG. 3B is a rear perspective view of the mobile terminal illustrated in FIG. 3A.

A mobile terminal 200 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

A body may include a case (or referred to as casing, housing, cover, etc.) defining an appearance of the mobile terminal 200. In this exemplary embodiment, the case may be divided into a front case 201 and a rear case 202. A space formed between the front and rear cases 201 and 202 may accommodate various electronic components. At least one intermediate case may further be disposed between the front and the rear cases 201 and 202.

Such cases may be injected using a synthetic resin or be formed of a metal, such as stainless steel (STS), titanium (Ti) or the like.

The terminal body is shown having a display module 251, an audio output module 252, a camera 221 and the like provided on the front case 201. Also, an interface unit 270, and the like may be disposed on side surfaces of the front case 201 and the rear case 202.

The display module 251 may occupy most of a principal surface of the front case 201. That is, the display module 251 may be disposed on a front surface of the terminal and display visual information. The audio output module 252 and the camera 221 may be disposed near one of both end portions of the display module 251, and a front input unit 231 and the microphone 222 may be disposed near the other end portion of the display module 251.

The front input unit 231 is one example of the user input unit 130 (see FIG. 1) and may include a plurality of manipulation units. The manipulation units may be commonly designated as a manipulating portion, and employ any method if it is implemented in a tactile manner allowing the user to perform manipulation with a tactile feeling. In this exemplary embodiment, the front input unit 231 may be implemented as a touch key. However, the present disclosure may not be limited to this. The front input unit 231 may include a push key.

Also, the display module 251 may form a touch screen together with a touch sensor. In this structure, the touch screen may serve as a user input unit. Accordingly, the front surface of the mobile terminal may be implemented in a form factor that a push key is not disposed below the touch screen. Here, the mobile terminal may be configured to an input manipulation with respect to the terminal main body may be allowed only through the display module 251 and a rear input unit 300 to be explained later.

Referring to FIG. 3B, a rear surface of the terminal body, namely, the rear case 202 is shown further having a camera module 221'. The camera module 221' faces a direction which is opposite to a direction faced by the camera 221 (see FIG. 3A), and may have different pixels from those of the camera 221.

For example, the camera 221 may operate with relatively lower pixels (lower resolution). Thus, the camera 121 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed in the terminal body to be rotatable or popped up.

A flash and a mirror may additionally be disposed adjacent to the camera 221'. The flash operates in conjunction with the camera 221' when taking a picture using the camera 221'. The mirror can cooperate with the camera 221' to allow a user to photograph himself in a self-portrait mode.

An audio output module (not illustrated) may further be disposed at a rear face of the terminal body. The rear audio output module can cooperate with the audio output module 252 (see FIG. 3A) to provide stereo output. Also, the audio output module may be configured to operate as a speakerphone.

A power supply unit 290 for supplying power to the mobile terminal 200 may be mounted in the terminal body. The power supply unit 290 may be mounted in the terminal body or detachably coupled directly onto the outside of the terminal body.

As shown in the drawings, the rear input unit 300 may be disposed on the rear face of the terminal body. The rear input unit 300, for example, may be located below the camera module 221'.

The rear input unit 300 may be manipulated by a user to input a command for controlling an operation of the mobile terminal 200, and set to allow inputting of various contents. For example, the rear input unit 300 may allow a user to input commands, such as power on or off, START, END, SCROLL or the like, volume adjustment of sounds output from the audio output module 252, or conversion of the display module 251 into a touch recognition mode, or the like.

The rear input unit 300 according to the present disclosure may be configured to receive an input in a pushing manner. In more detail, the rear input unit 300 may be implemented as a mechanical or physical button which is a relative concept with respect to a touch screen.

Hereinafter, description will be given in more detail of one exemplary embodiment disclosed herein, with reference to the accompanying drawings.

In general, a printed circuit board (PCB) may be built in a terminal body. The printed circuit board may be mounted, for example, to the front case 201, the rear case 202, or a separate structure. The separate structure may form an intermediate case. Hereinafter, the following embodiment illustrates that the front case 201 or the rear case 202 is separated provided, but the present disclosure may not be limited to the structure. Those cases 201 and 202 may also be integrally formed.

The printed circuit board may be an example of a controller 180 (see FIG. 1) for controlling various operations of the mobile terminal. The printed circuit board may be provided in plurality, which may be combined to execute the functions of the controller 180. To execute the functions, various electronic devices may be installed on the printed circuit board.

Also, the printed circuit board may be electrically connected to an antenna (not illustrated), so as to process wireless signals corresponding to wireless electromagnetic waves which are transmitted and received via the antenna. The antenna may be located between the structure and the printed circuit board, such that wireless signals can generally be transmitted and received through the rear case 202.

The printed circuit board may be electrically connected to a camera module 221', and a battery cover 203 may cover the rear case 202.

Hereinafter, a rear input unit 300 in accordance with one exemplary embodiment disclosed herein will be described. The rear input unit 300 may overlap the display module 251 in a thickness direction of the main body and be exposed to a rear surface of the main body. Hereinafter, a detailed structure of the rear input unit 300 and a side surface structure of the terminal will be described in sequence.

Figure 6:
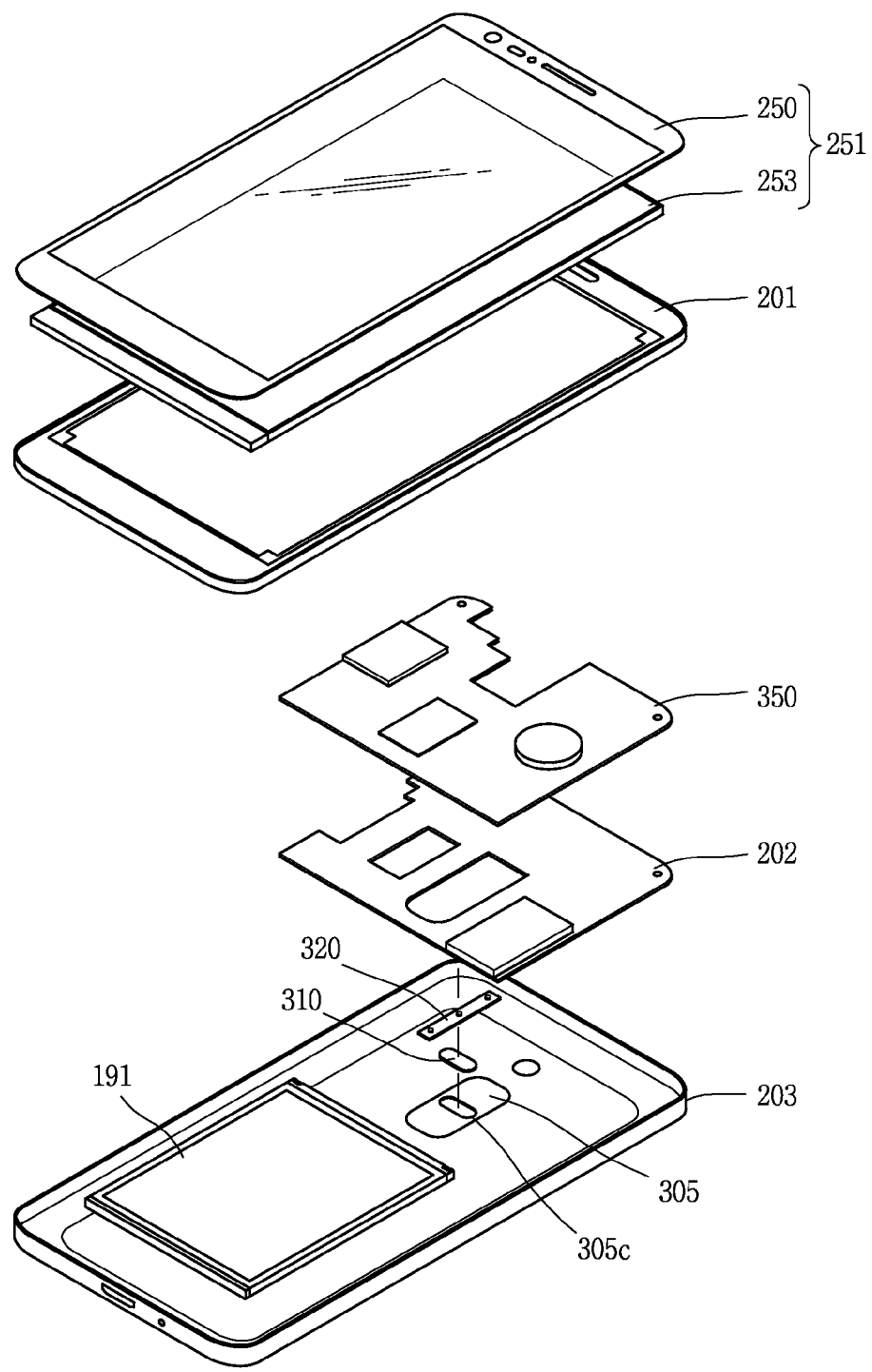
FIG. 6 is an exploded perspective view of a mobile terminal in accordance with one exemplary embodiment disclosed herein.

The rear input unit 300 may be disposed between the camera module 221' and a battery 191 (see FIG. 6). The rear input unit 300 may be located at a position where it overlaps the display module 251 (see FIG. 3A) of the front surface of the terminal body. Accordingly, it can be realized that the rear input unit 300 is disposed on a rear surface of the display module 251 for use. Here, the present disclosure may not be limited to this, and the position of the rear input unit 300 may be changeable.

Figure 4:
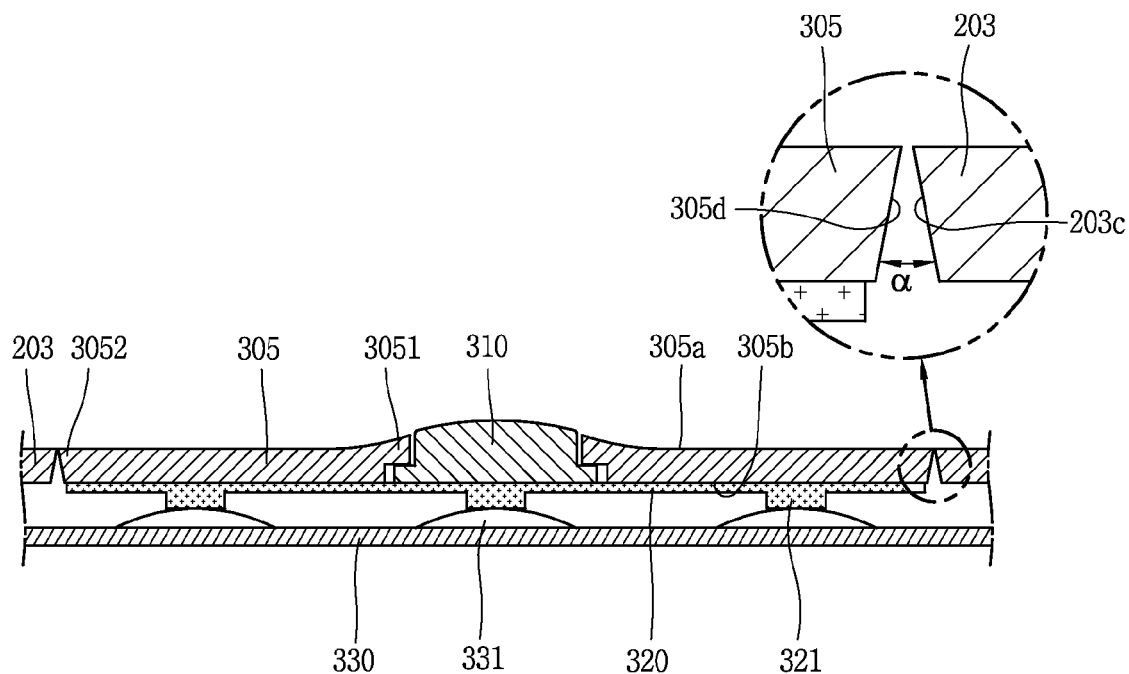
FIG. 4 is a sectional view schematically illustrating a rear input unit in accordance with one exemplary embodiment.

FIG. 4 illustrates a sectional view and a partially detailed sectional view of the rear input unit 300 in accordance with the one exemplary embodiment disclosed herein. As illustrated in FIG. 4, the rear input unit 300 may include a button part 310 and a input part 305. The input part 305 may be spaced apart from the battery cover 203. That is, the mobile terminal may include the rear input unit 300, which includes the button part 310 exposed to the rear surface of the terminal main body to receive a push input of a first function, and the input part 305 disposed adjacent to the first input button 310 and exposed to the rear surface of the main body to receive a push input of a second function. The input part 305 may be formed integrally with a case, such as the battery cover 203. One side 3051 of the input part 305 may be formed at a portion adjacent to the button part 310 to face each other, and the other side 3052 may be formed adjacent to the battery cover 203. Here, the user may press an upper surface 305a of the input part 305, and a lower surface 305b of the input part 305 may come in contact with a rubber member 320 which will be explained later.

Here, the case may cover the terminal body to form at least part of appearance of the terminal.

Figure 5:
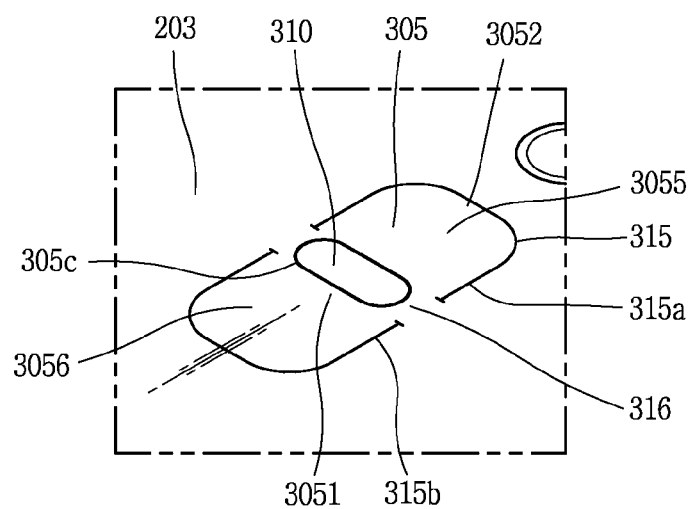
FIG. 5 is a planar view of a rear input unit in accordance with one exemplary embodiment disclosed herein.

As illustrated in FIG. 5, the input part 305 may include two cutoff lines 315a and 315b spaced apart from each other, and a connecting portion 316 formed between ends of the spaced penetration lines 315. The input part 305 may be partitioned to be rotatable based on the connecting portion 316.

The cutoff line 315 may generate a boundary. Since the cutoff line 315 is formed through a case, for example, the battery cover 203, along a predetermined path, so it may also be called as a penetration line. Also, the cutoff line 315 may be called as a partition line in the aspect of dividing the battery cover 203 into two or more regions.

Here, the partition line may divide the battery cover 203 into an inner region and an outer region. The inner region and the outer region may be connected by the connection portion 316. That is, the cutoff line 315 and the connecting portion 316 may form a closed region.

Hereinafter, the cutoff line, the partition line and the penetration line will be referred to as a penetration line.

In one exemplary embodiment disclosed herein, a first input part 3055 may be formed by one penetration line 315a, and a second input part 3056 may be formed by another penetration line 315b. For example, in addition to the first input part 3055, the second input part 3056 may be formed by the second penetration line, which faces the penetration line 315a and has the same shape as the penetration line 315a. The two penetration lines 315a and 315b may be spaced apart from each other. Accordingly, the connecting portion 316 which connects the first input portion 3055 and the second input portion 3066 may be formed between ends of the penetration lines 315a and 315b.

Here, the first function may be a function associated with power-on or power-off or an activation of the display unit. The button part 310 may be a power key of the terminal. The second function may be a function associated with a volume adjustment of sounds output from the terminal main body, or a scroll function with respect to output information on the display module 251.

As illustrated in the detailed sectional view of FIG. 4, the input part 305 and the battery cover 203 may be spaced apart from each other, and the spacing may gradually increase as going down into the inside. Accordingly, a contact section between the input part 305 and the battery cover 203 may have a triangular shape, namely, a side surface 305d of the input part 305 and a side surface 203c of the battery cover 203 may form a triangular shape. This may allow the other side 3052 of the input part 305 to be freely moved up and down without being interrupted by the battery cover 203. To this end, in one exemplary embodiment disclosed herein, the battery cover 203 may be cut using laser beam from an inner side of the battery cover 203. By realizing the triangular shape of the contact section between the input part 305 and the battery cover 203, button sticking, which may be caused when executing the second function by pushing an end of the input part 305, may be prevented, and a gap exposed to the appearance of the terminal may be minimized. The gap may refer to an interval between the input part 305 and the battery cover 203. As illustrated in the enlarged view of FIG. 4, the side surface 305d of the input part 305 and the side surface 203c of the battery cover 203 may be spaced apart from each other, forming a gap or a hole at an upper portion thereof.

Here, the cutoff surfaces of the battery cover 203 and the input part 305 may form an angle $\alpha$ in the range of 5 to 10°. In case of being less than 5°, the end of the input part 305 may come in contact directly with the cutoff surface of the battery cover 203, which may cause the input part 305 to be stuck. If the angle is greater than 10°, the laser-cutoff section may extend, causing an economic loss.

Here, the laser cutting may be executed using a CO2 laser with an output of 40~50 W. To improve accuracy, the laser may be moved by 2 to 4 cycles so as to form a path. The path may indicate a movement path of the laser from one end to the other end of the penetration line 315. The cutting along the path may be repetitively executed more than two times. A material to form the battery cover 203 may include a PC-based mold or an acrylic window.

FIG. 5 is a planar view of the rear input unit 300 in accordance with the one exemplary embodiment disclosed herein. The input part 305 may be disposed adjacent to the button part 310. The input part 305 may be partitioned by the penetration lines 315. The penetration lines 315 may not be formed at both sides of the button part 310. Portions where the input part 305 and the battery cover 203 are connected without forming the penetration lines 315 may be referred to as the connecting portion 316. In more detail, both ends of the pair of penetration lines 315a and 315b may be spaced apart from each other, and symmetrical to each other based on the button part 310. A portion connecting the both ends of each of the penetration lines 315a and 315b may be called as the connecting portion 316. Here, the connecting portion 316 may extend from the battery cover 304 so as to be integrally formed with the battery cover 203.

Both end portions of the input part 305, as similar to a cantilever, may be rotatable centering on the connecting portion 316. FIG. 5 illustrates the input part 305 is formed similar to a rectangular shape. However, the present disclosure may not be limited to this. The input part 305 may also be formed in a polygonal shape or a circular shape.

FIG. 6 is an exploded perspective view of a mobile terminal in accordance with one exemplary embodiment disclosed herein. Description will be given of a mobile terminal according to one exemplary embodiment with reference to FIG. 6.

A mobile terminal in accordance with one exemplary embodiment may include a display module 251 having a window 250 and an LCD module 253, a front case 201 having the display module 251 disposed thereon, a printed circuit board 350 attached onto a rear surface of the front case 201 to control the mobile terminal, a rear case 202 covering components mounted on the printed circuit board 350, and a battery cover 203 covering the rear case 202 and the battery 191.

Figure 10:
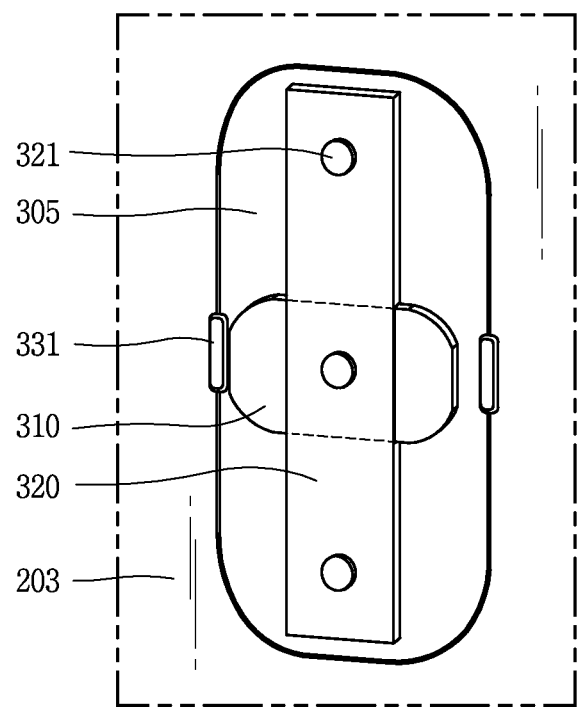
FIGS. 10 and 11 are rear views of a rear input unit in accordance with one exemplary embodiment disclosed herein.
Figure 11:
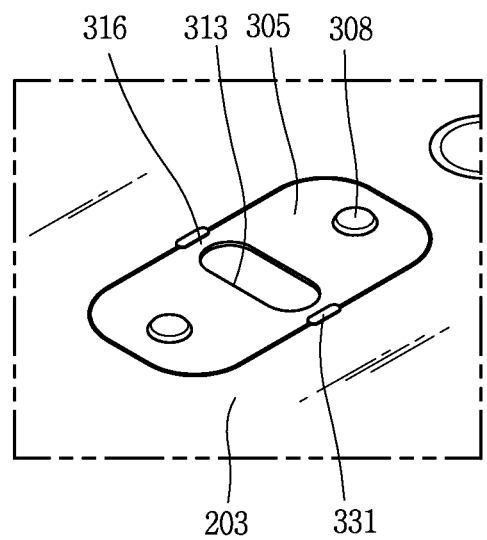

FIGS. 10 and 11 are rear views of a rear input unit in accordance with one exemplary embodiment disclosed herein. The one exemplary embodiment may employ both a method using a rubber actuator and a method using a molding dome for forming the rear input unit. FIG. 10 illustrates the method using the rubber actuator, and FIG. 11 illustrates the method using the molding dome.

Figure 12:
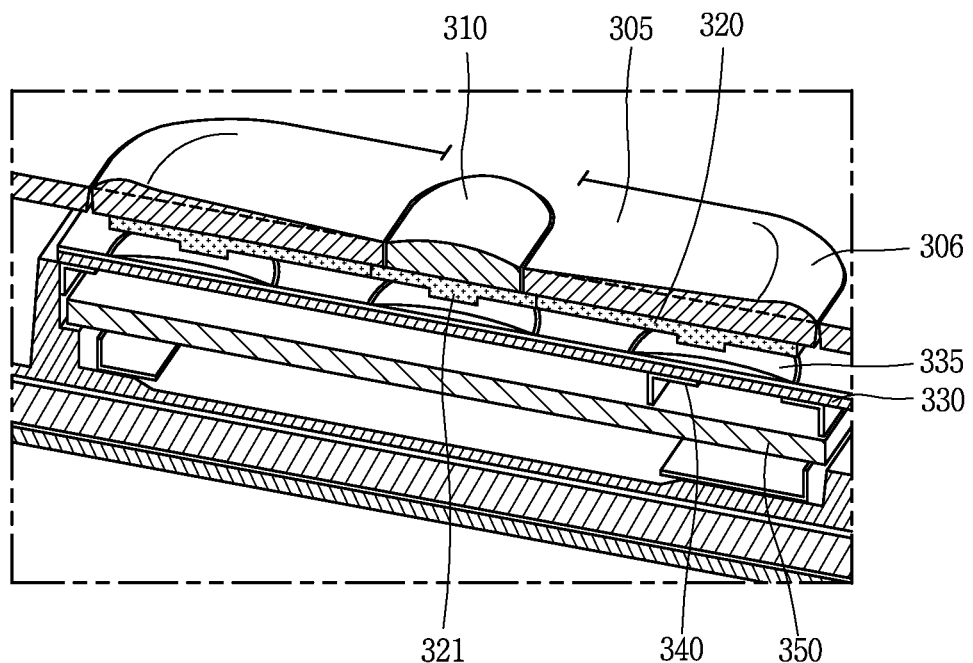
FIG. 12 is a cutoff perspective view of a rear input unit in accordance with one exemplary embodiment disclosed herein.

FIG. 12 is a cutoff perspective view of a rear input unit in accordance with one exemplary embodiment disclosed herein. As illustrated in FIGS. 10 and 12, an example having a rubber actuator, namely, a rubber member 320 will be described first. The rear input unit 300 may include a rubber member 320 having pushing protrusions 321 formed on lower surfaces of the button part 310 and the input part 305 and located on positions corresponding to the button part 310 and the input part 305, a flexible printed circuit board 330 disposed below the rubber member 320 and having dome switches 335, and a printed circuit board 350 formed below the flexible circuit board 330 and electrically connected to the flexible printed circuit board 330.

Figure 15:
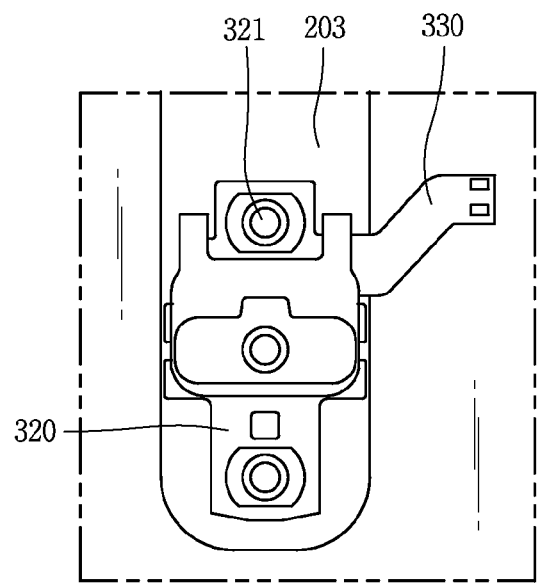
FIG. 15 is a view illustrating a flexible printed circuit board coupled to a battery cover in accordance with one exemplary embodiment disclosed herein.

That is, in the method using the rubber actuator, the rubber member 320 may be attached onto an inner surface of the battery cover 203. The rubber member 320 may be provided with the pushing protrusions 321. The pushing protrusions 321 may push the dome switches 335 formed on the flexible printed circuit board 350, such that the rear input unit 300 and the printed circuit board 350 may be electrically connected. Also, referring to FIG. 15, the flexible printed circuit board 330 may be attached to the battery cover 203 with one end portion connected to the printed circuit board 350.

Figure 16:
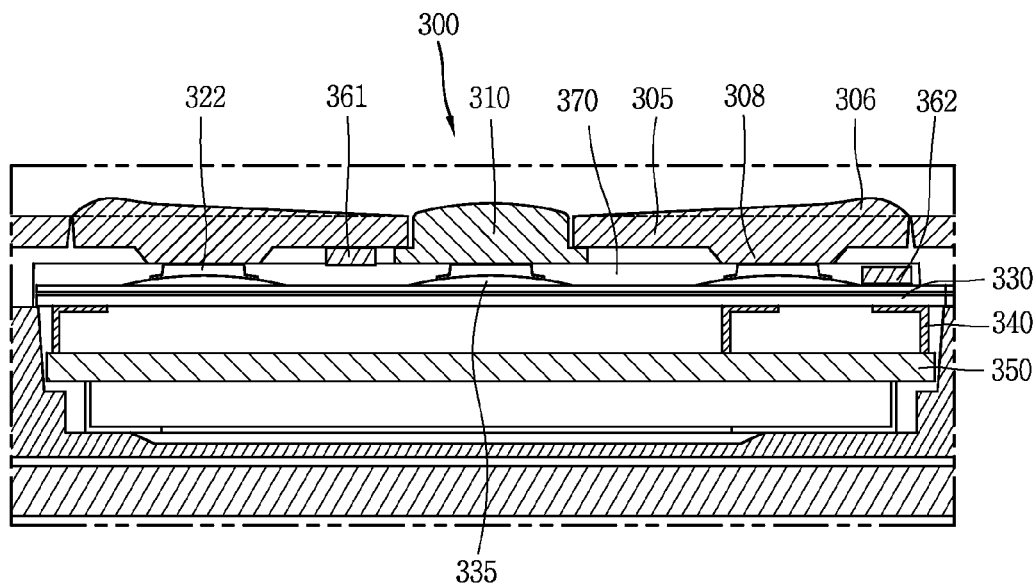
FIG. 16 is a sectional view of a rear input unit in accordance with one exemplary embodiment disclosed herein.

On the other hand, FIG. 16 is a sectional view of the rear input unit 300 in accordance with the one exemplary embodiment disclosed herein. An example having a molding dome will be described with reference to FIGS. 11 and 16, the rear input unit 300 may include a flexible printed circuit board 330 disposed below the button part 310 and the input part 305 and having dome switches 335 on positions corresponding to the button part 310 and the input part 305, and a printed circuit board 350 formed below the flexible printed circuit board 330 and electrically connected to the flexible printed circuit board 330. Protrusions 308 which are contactable with the dome switches 335 may be formed on a lower surface of the input part 305. The protrusions 308 may press actuators 322 formed on the dome switches 335, respectively.

In the method using the molding dome, the rubber member 320 may not be required. The protrusions 308 may be formed on the lower surface of the battery cover 203 at the positions corresponding to the dome switches 335. When the protrusions 308 press the actuators 332, the actuators 332 may press the dome switches 335. The protrusions 308 may be formed on a part of the rear surface of the input part 305, and the other rear surface except for the protrusion-formed portions may be flat. Also, a through hole 313 (see FIG. 11) may be formed through a central portion of the battery cover 203 such that the button part 310 can be inserted therethrough, and a connecting portion 316 may be formed at both sides of the through hole 313.

The rubber actuator method and the molding dome method may be different in that where a member pressing the dome switch 335 is formed. In the rubber actuator employing method, the rubber member 320 may be provided on the rear surface of the rear input unit 300 and the pushing protrusion 321 formed on the rubber member 320 may press the dome switch 335. On the other hand, in the molding dome employing method, the actuator 322 pressing the dome switch 335 may not be attached to the rear surface of the button part 310 or the input part 305, but be closely adhered on the dome switch 335, so as to easily press the dome switch 335 when being pressed.

Here, as illustrated in FIGS. 12 and 16, a shield can 340 may further be provided on a lower surface of the flexible printed circuit board 330. The shield can 340 may prevent damages, which may be caused on components disposed in the mobile terminal when the button part 310 and the input part 305 are excessively pressed, and also serve to shield electromagnetic interference (EMI) which is caused from various types of components.

In the meanwhile, when the input part 305 is pressed, a user's finger 309 may be problematically stuck at a boundary between the input part 305 and the battery cover 203. One exemplary embodiment disclosed herein may provide a structure for preventing it. That is, a convex portion 306 may be formed at an end portion of the input part 305 or a portion of the battery cover 203 which faces the end of the input part 305 may be inclined down toward an inside of the battery cover 203. In other words, the convex portion 306 or a first inclined portion 203a and a second inclined portion 203b may be formed at a boundary of the battery cover 203 or the input part 305.

Figure 7A:
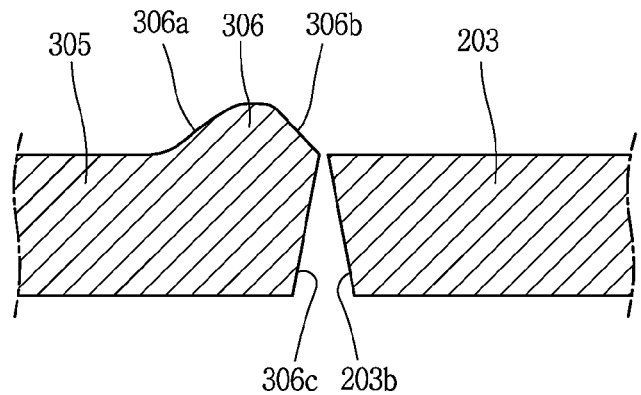
FIGS. 7A, 7B, and 7C are sectional view illustrating a contact state between a input part and a battery cover in accordance with one exemplary embodiment disclosed herein.
Figure 7B:
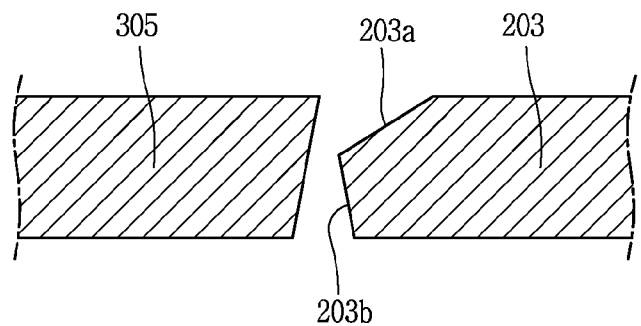
Figure 7C:
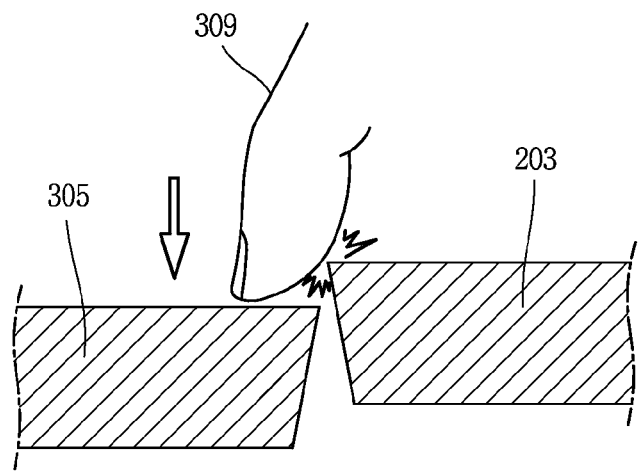

FIG. 7C illustrates that the user's finger 309 is interrupted due to the battery cover 203 when pushing the input part 305. FIGS. 7A and 7B illustrate that the convex portion 306 is formed at the end of the input part 305, and the first inclined portion 203a and the second inclined portion 203b are formed on the battery cover 203, respectively. Referring to FIG. 7A, the convex portion 306 may include a first convex surface 306a which is getting higher toward the battery cover 203, and a second convex surface 306b which extends from the first convex surface 306a and is getting lower toward the battery cover 203. Here, the first convex surface 306a and the second convex surface 306b may be formed in an inclined manner. The first convex surface 306a may have an inclination, which is large enough to avoid a contact with the battery cover 203 when the user pushes the input part 305.

Also, referring to FIG. 7B, without forming the convex portion 306 on the input part 305, the first inclined portion 203a may be formed to get lower toward the input part 305, and simultaneously, the second inclined portion 203b extending from the first inclined portion 203a may be inclined to get farther away from the input part 305, thereby minimizing the interference with the input part 305. Here, the first inclined portion 203a and the second inclined portion 203b may have the same inclination angle. However, even in this case, the side surface 305d of the input part 305 may be inclined away from the battery cover 203.

Figure 8:
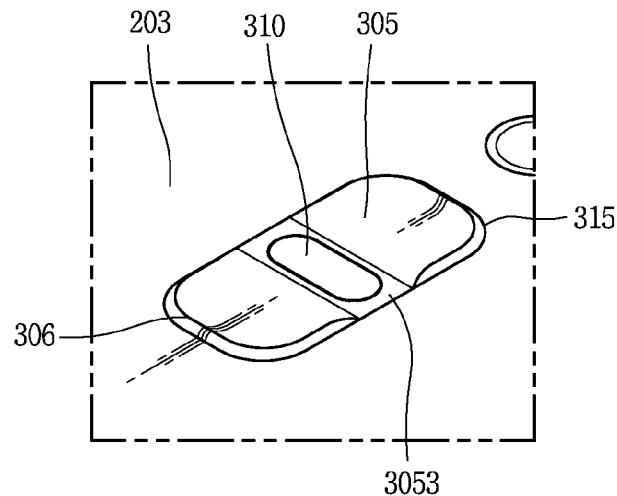
FIG. 8 is a perspective view illustrating that a convex portion is formed on a input part in accordance with one exemplary embodiment disclosed herein.
Figure 9:
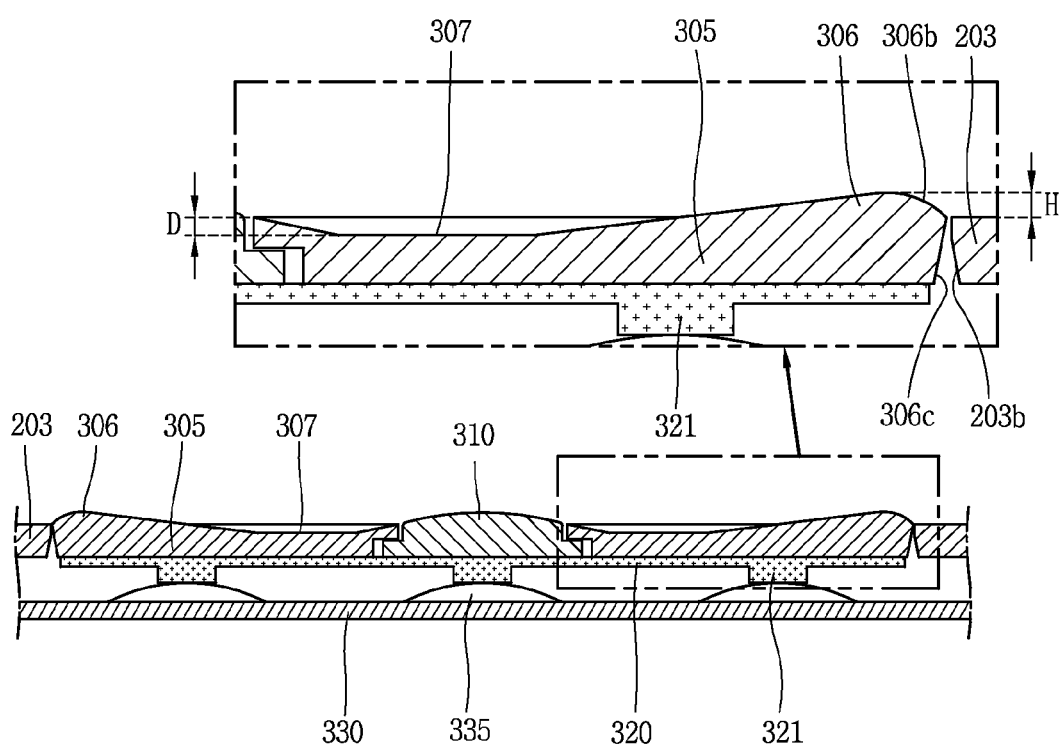
FIG. 9 is a sectional view illustrating that a convex portion and a concave portion are formed on a input part in accordance with one exemplary embodiment disclosed herein.

FIG. 8 is a front view of the rear input unit 300 in accordance with the one exemplary embodiment disclosed herein, which illustrates that the convex portion 306 is formed on the input part 305, and FIG. 9 is a sectional view illustrating that the convex portion 306 and a concave portion 307 are formed on the rear input unit 300 in accordance with one exemplary embodiment disclosed herein.

As illustrated in FIGS. 8 and 9, the input part 305 may be provided with the convex portion 306 on an end thereof along a lengthwise direction so as to prevent the finger 309 from being stuck when the input part 305 is pushed. Also, the concave portion 307 may be formed on a central portion of the input part 305 so as to prevent the user's finger 309 from being stuck when the second button portion 305 is pushed. In addition, when the concave portion 307 is simultaneously formed with the convex portion 306, it may bring about a reduction of the level of protrusion of the convex portion 306.

For example, referring to FIG. 9, if it is assumed that a protruding height of the convex portion 306 is H and a depth of the concave portion 307 is D, when the concave portion 307 is not formed, the protruding height may be H, but when the concave portion 307 is formed, the externally-protruding height may further be increased by H+D. Therefore, the protruding height of the convex portion 306 may be adjusted to be reduced. When both the concave portion 307 and the convex portion 306 are simultaneously formed, the user may press an approximately middle point between the convex portion 306 and the concave portion 307. Accordingly, the user's finger 306 may rarely come in contact with the battery cover 203. Here, as illustrated in FIG. 8, a recess portion 3053 may be formed on the input part 305 to be recessed rather than the other portions, so as to obtain the same effect as forming the concave portion 307.

According to one exemplary embodiment disclosed herein, reinforcing members 331 may be provided at the connecting portion 316. A structure of preventing generation of cracks on the reinforcing members 331 and the connecting portion 316 will be described with reference to FIGS. 10, 11 and 14.

FIG. 14 is a view illustrating a structure for reinforcing rigidity of the rear input unit 300 in accordance with one exemplary embodiment disclosed herein.

The rear input unit 300 according to one exemplary embodiment disclosed herein, as illustrated in FIGS. 10, 11 and 14, may be provided with various shapes of reinforcing members 331, 332 and 333. FIGS. 10 and 11 illustrate typical shapes of reinforcing members 331. The reinforcing members 331 may be formed by double-injection of the battery cover 203. The reinforcing members 331 may serve to connect a disconnected portion of the penetration line, and also serve as a support point upon a rotary motion of the input part 305.

Figure 14A:
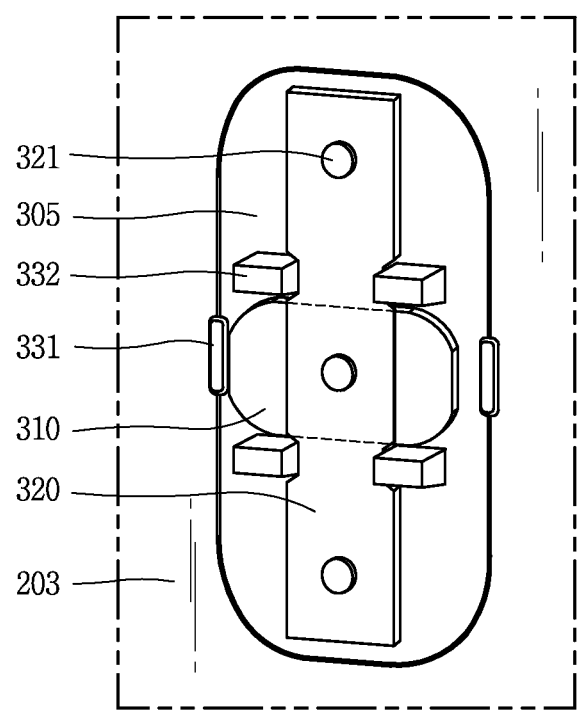
FIGS. 14A and 14B are views illustrating a structure for reinforcing rigidity of a rear input unit in accordance with one exemplary embodiment disclosed herein.
Figure 14B:
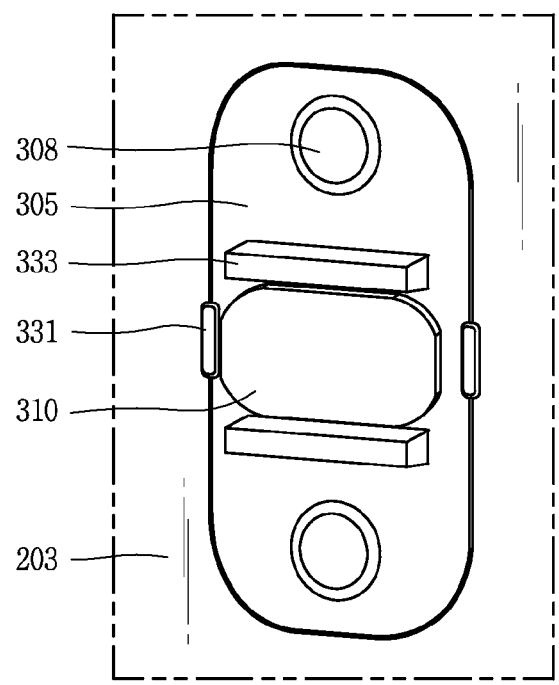

FIG. 14A illustrates that four ribs 332 are further formed around the rear surface of the button part 310, in addition to the reinforcing members 331. FIG. 14B illustrates that ribs 333 are further formed between the button part 310 and the input part 305 on the rear surface of the battery cover 203, in addition to the reinforcing members 331. The ribs 333 illustrated in FIG. 14B may be formed adjacent to the through hole 313 through which the button part 310 is inserted. The ribs 332 and 333 may prevent the input part 305 from being drooped even when the input part 305 is continuously manipulated, and also reinforce rigidity of the input part 305 together with the reinforcing members 331. In addition, the ribs 332 and 333 may prevent another button part from being simultaneously pushed when one button part is pushed.

Figure 13A:
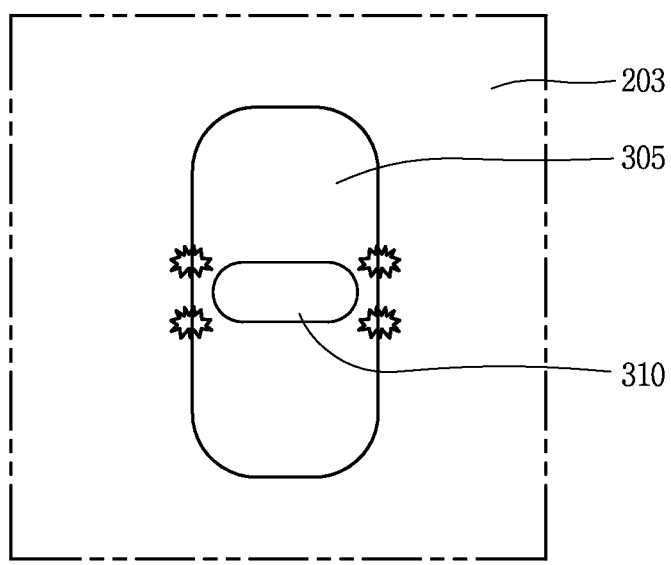
FIGS. 13A, 13B, 13C, 13D, and 13E are views illustrating a shape of an end of a cutoff portion in accordance with one exemplary embodiment disclosed herein.
Figure 13B:
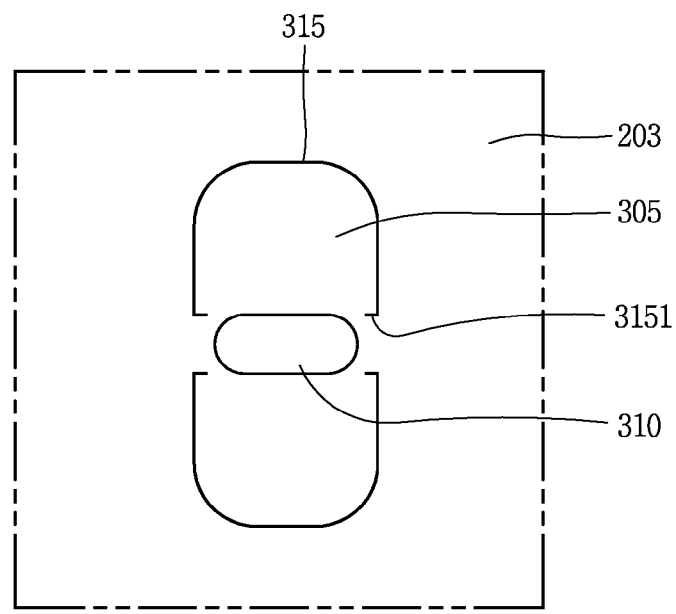
Figure 13C:
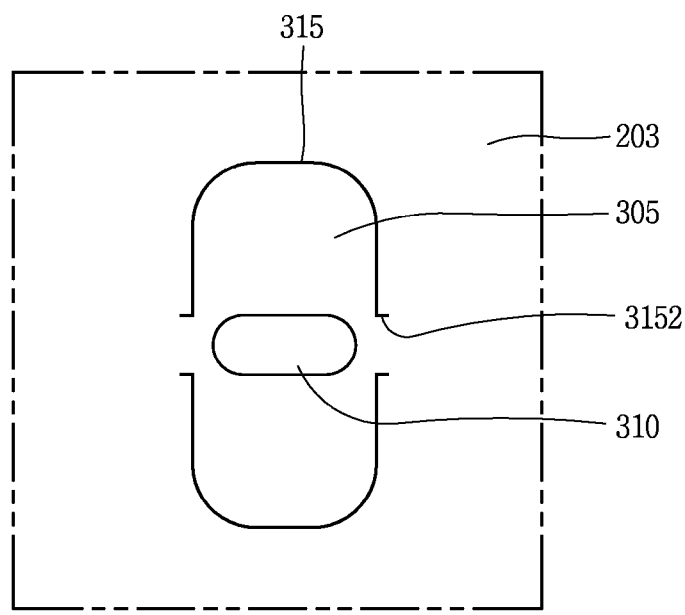
Figure 13D:
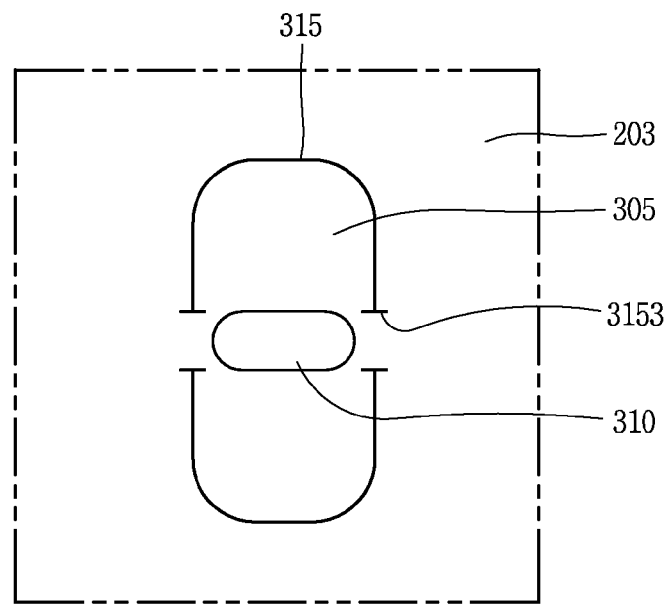
Figure 13E:
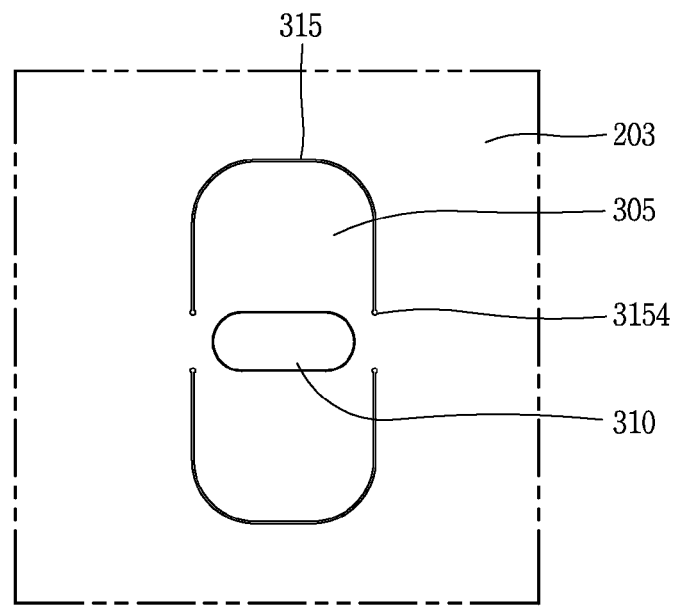

Meanwhile, cranks may be generated at the ends of the penetration line 315, which partitions the input part 305, due to the rotary motion of the input part 305 centering on the connecting portion 316. That is, the cranks may be generated on a portion on which stress is continuously concentrated. To prevent this, in one exemplary embodiment disclosed herein, as illustrated in FIGS. 13B to 13D, both ends 3151, 3152, 3153 of the penetration line 315 of the input part 305 may be formed to face the inner side of the input part 305 (see FIG. 13B), or face the outer side of the input part 305 (see FIG. 13C), or face both the inner and outer sides of the input part 305 (see FIG. 13D). Here, the penetration line 315 may be generated in a cutting manner using a laser, starting the cutting from one end portion to the other end portion. Here, as illustrated in FIG. 13E, the one end portion and the other end portion may be symmetrical to each other. Both ends 3154 of the penetration line 315 of the input part 305 may be formed in a circular shape.

Upon being formed in the circular shape, it may be more advantageous in preventing cracks, by forming a portion, on which a moment generated upon the rotary motion of the input part 305 is concentrated, to be circular other than angular, like a part of a polygon, such that the moment can be evenly distributed to the circular portion.

FIG. 16 is a sectional view of a rear input unit in accordance with one exemplary embodiment disclosed herein, which is a sectional view of the rear input unit 300 having a light-emitting unit which emits light along the penetration line 315 partitioning the input part 305.

The light-emitting unit related to one exemplary embodiment may include light sources 361 and 362, and a light guide 370 uniformly distributing light of the light sources 361 and 362. The first light source 361 may be disposed at one side below the input part 305 to emit light to an edge of the button part 310. The second light source 362 may be disposed at the other side below the input part 305. The light guide 370 may be disposed at one side of the second light source 362 to guide light to the penetration line 315 of the input part 305. The light sources 361 and 362 may be implemented as an LED, for example. The light guide 370 may be implemented by using a light guide film (LGF) or a light guide plate (LGP) for thickness adjustment. It has been illustrated that the light-emitting unit merely includes the light sources and the light guide 370, but the present disclosure may not be limited to this.

Figure 17A:
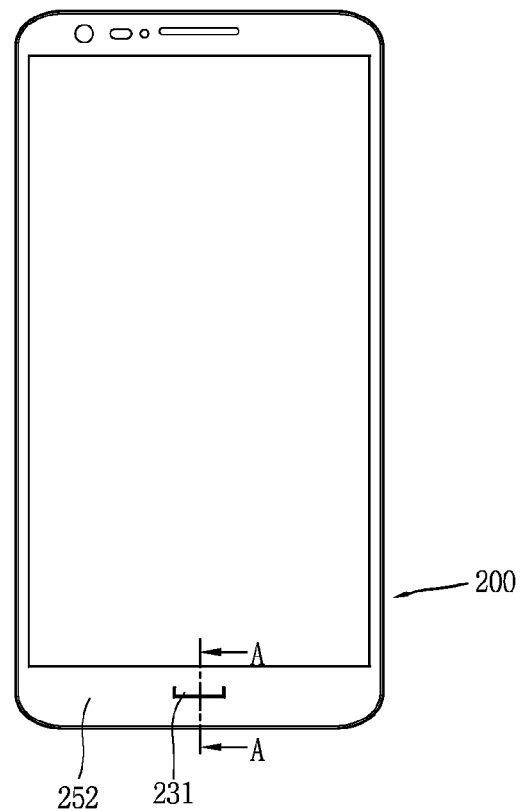
FIG. 17A, FIG. 17B, and FIG. 18 are views illustrating a button part with various forms of a cutoff portion in accordance with one exemplary embodiment disclosed herein.
Figure 17B:
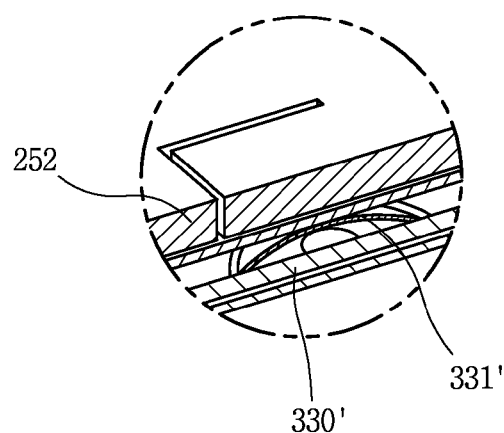
Figure 18:
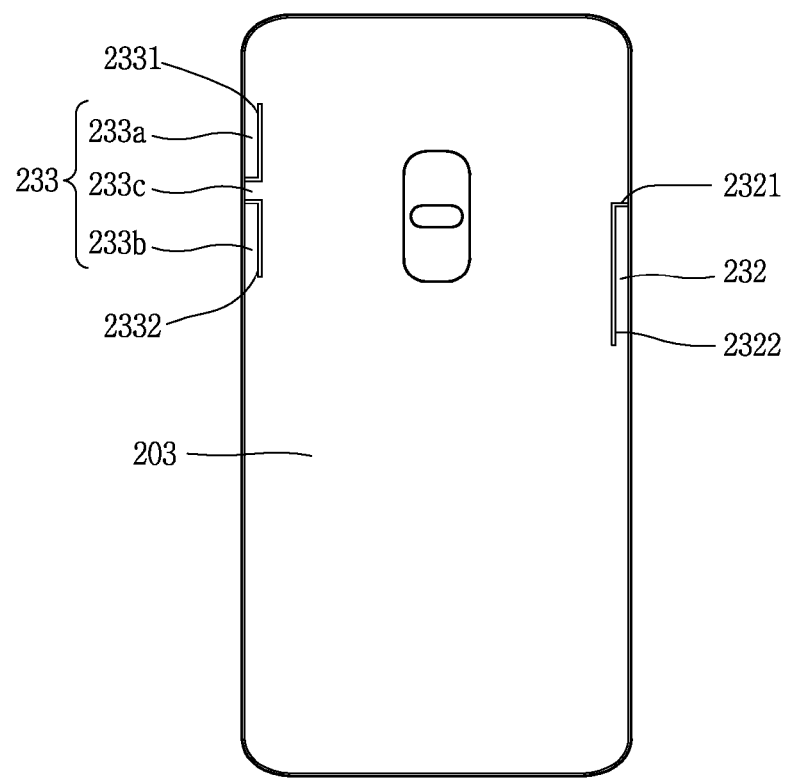

Meanwhile, FIGS. 17A, 17B and 18 illustrate a button part with various forms of the penetration lines in accordance with one exemplary embodiment disclosed herein. FIG. 17A illustrates a front surface of a mobile terminal 200, and FIG. 17B is a cutoff sectional view taken along the line A-A of FIG. 17A.

In accordance with one exemplary embodiment disclosed herein, side input units 232 and 233 for user input, formed on a side surface of the mobile terminal, may be formed in a laser cutting manner. A front input unit 231 may be partitioned in a cutting manner and integrally formed with a window. Here, the side input unit 232 may have a penetration line in a shape like an alphabet 'L.' The penetration line may be divided into a first penetration line 2321 and a second penetration line 2322. The side input unit 232 may be formed by the first penetration line 2321 which is formed from a side surface of the terminal main body, and the second penetration line 2322 which extends from the first penetration line 2321 and is formed approximately in parallel to the side surface of the terminal main body. In order to prevent the side input unit 232 from being interrupted due to the battery cover 203 when the user pushes the side input unit 232, the second penetration line 2322 may be formed in such a manner that a distance from the terminal main body, namely, the side surface of the battery cover 203 cannot be constant (uniform).

Upon desiring to perform a function such as a volume adjustment using the side input unit 232, upper and lower buttons should be formed. As illustrated in FIG. 18, such upper and lower buttons may be formed by an upper cutoff line 2331 and a lower penetration line 2332 each having a shape like an alphabet 'L.' That is, an upper button 233a may be formed by the upper penetration line 2331, and a lower button 233b may be formed by the lower penetration line 2332.

Here, the side input unit may include the upper button 233a and the lower button 233b formed by the L-like upper and lower penetration lines 2331 and 2332, respectively. The upper penetration line 2331 and the lower penetration line 2332 may be spaced apart from each other. Here, as illustrated in FIG. 18, the upper penetration line 2331 and the lower penetration line 2332 may be formed to face opposite directions to each other or face each other. In addition, the upper penetration line 2331 and the lower penetration line 2332 may commonly use the first penetration line 2321, or may have the first penetration lines 2321 with a predetermined spacing therebetween. Here, the first penetration lines 2321 of the upper and lower penetration lines 2331 and 2332 are space from each other, the second penetration lines 2322 thereof may also be spaced from each other.

As such, when the first penetration lines 2321 are spaced from each other, an intermediate area 233c may be formed between the upper button 233a and the lower button 233b. The intermediate area 233c may be limited by an interval between the upper and lower buttons 233a and 233b. Therefore, the upper and lower buttons 233a and 233b may be supported by adjusting a size of the intermediate area 233c. Here, it may also be allowed to turn up a volume by pushing the upper button 233a and turn down the volume by pushing the lower button 233b.

Here, dome switches 331' and a flexible printed circuit board 330' having the dome switches 335' formed thereon may be formed below the side input units 232 and 233 and the front input unit 231. Here, the front input unit 231 may be formed on a window 250. The window 250 may be a plastic-based window, such as an acrylic window.

The front input unit 231 and the side input units 232 and 233 are illustrated in FIGS. 17A, 17B and 18. As illustrated in FIGS. 17A and 17B, a part of the window 250 may be cut by laser beam such that one end portion thereof can be pushed, as similar to a cantilever. Accordingly, when the dome switch 335' formed on the flexible printed circuit board 330' is pressed, the front input unit 231 may responsively operate. Also, the side input units 232 and 233 may be formed in the same manner.

The foregoing embodiment has illustrated that the input part 305 is formed at each of both sides. However, the input part 305 may not have to be always formed by a pair. Hence, it may also be available within the scope of the present disclosure that a single input part 305 is formed in a laser cutting manner.

Hereinafter, description will be given of a method of forming a case of a mobile terminal in accordance with one exemplary embodiment disclosed herein.

Figure 19:
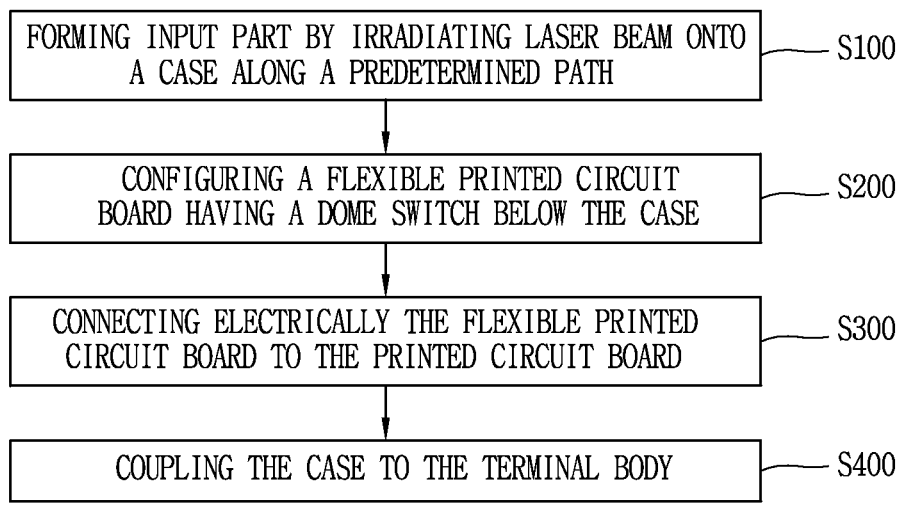
FIG. 19 is a flowchart illustrating a method of forming a case of a mobile terminal in accordance with one exemplary embodiment disclosed herein.

FIG. 19 is a flowchart illustrating a method of forming a case of a mobile terminal in accordance with one exemplary embodiment disclosed herein. In the one exemplary embodiment, an input part 305 may be formed in a manner of irradiating laser beam to a case, such as a battery cover 305, which covers a terminal body and forms a part of appearance of the terminal, along a predetermined path (S100). The case may then be coupled to the terminal body, completely forming the case of the terminal (S400).

Here, in the coupling step, a flexible printed circuit board 330 on which a dome switch 335 is formed may be disposed below the case (S200). The flexible printed circuit board 330 may be electrically connected to a printed circuit board 350 such that the input part 305 can operate (S300).

The input part 305 may be formed by irradiating the laser beam from an inner side of the case 203 along the path, in a manner that the laser beam goes and returns the path more than two times.

Here, in response to the irradiation of the laser beam, surfaces of the case and the input part, facing each other, may have a gradually increased spacing therebetween toward the inside thereof. Ends of the path may be formed into a circular shape by irradiating the laser beam. The circular ends of the path may allow for distribution of stress.

Also, as aforementioned, the stress may be concentrated on end portions of the path, which are cut by the laser beam. This may bring about a generation of cracks. To prevent this, various paths may be formed at the end portions of the path. For example, as illustrated in FIGS. 13B to 13E, the end portions may extend toward an inner side of the input part 305 or an outer side of the input part 305. Or, the end portions may extend toward both of the inner and outer sides of the input part 305.

The configuration and method of the aforementioned embodiments may not be applied to the mobile terminal in a limiting manner, but those embodiments may be configured by selective combination of all or part of each embodiment so as to implement different variations.

It also be understood by those skilled in the art that the present disclosure can be embodied in other detailed forms without changing the technical scope and the essential features.

Therefore, all changes and modifications that fall within the metes and bounds of the claims, or equivalents of such metes and bounds are therefore intended to be embraced by the appended claims.

What is claimed is:

1. A mobile terminal comprising:
a terminal main body; and
a case covering the terminal main body, and forming at least a part of an appearance of the terminal,
wherein the case comprises a penetration line formed through the case along a predetermined path, and forming a connecting portion between ends of the penetration line,
wherein the connecting portion extends from the case, and an input part is formed on a region formed by the penetration line and the connecting portion, the input part being rotatable based on the connecting portion, and
wherein the case and the input part are spaced from each other by the penetration line, and the spacing is gradually increased toward an inner side thereof.

2. The terminal of claim 1, wherein both ends of the penetration line are spaced apart from each other, and the penetration line and a line connecting the both ends of the penetration line form a closed region.

3. The terminal of claim 2, wherein the case is a window formed on a front surface of the terminal main body or a battery cover formed on a rear surface of the terminal main body.

4. The terminal of claim 1, wherein an inclination angle formed between side surfaces of the case and the input part is in the range of 5° to 10°.

5. The terminal of claim 1, wherein a convex portion is formed at an end of the input part.

6. The terminal of claim 5, wherein the input part comprises a concave portion recessed into a central portion thereof.

7. The terminal of claim 1, wherein the side surface of the case, facing the end of the input part, is inclined from the input part to be gradually away therefrom.

8. The terminal of claim 1, further comprising a dome switch disposed below the case; and
   a printed circuit board disposed below the dome switch and electrically connected to the dome switch.

9. The terminal of claim 8, further comprising a rubber member disposed on a rear surface of the input part, and having a pushing protrusion corresponding to the input part.

10. The terminal of claim 9, wherein the dome switch is formed on a flexible printed circuit board, and
    further comprising a shield can disposed below the flexible printed circuit board and configured to shield electromagnetic interference (EMI) generated from components.

11. The terminal of claim 8, wherein an actuator is formed on the dome switch, and a protrusion is formed on a lower surface of the input part to be contactable with the actuator.

12. The terminal of claim 11, wherein ribs are formed between the rear surface of the connecting portion and the protrusion formed on the lower surface of the input part.

13. The terminal of claim 1, wherein the ends of the penetration line extend toward an inner or outer side of the input part, or toward both of the inner and outer sides of the input part.

14. The terminal of claim 1, wherein the ends of the penetration line are formed in a circular shape.

15. The terminal of claim 1, further comprising a second input part formed by a second penetration line, the second penetration line facing the penetration line and having the same shape as the penetration line, the two penetration lines being spaced apart from each other, wherein a connecting portion is formed between the ends of the penetration lines to connect the input part and the second input part to each other.

16. The terminal of claim 15, wherein reinforcing members are formed on a rear surface of the connecting portion at positions where the two penetration lines are connected.

17. The terminal of claim 16, wherein at least one rib is formed around the rear surface of the connecting portion.

18. The terminal of claim 15, further comprising a power button part disposed between the input part and the second input part, and exposed to a rear surface of the terminal main body, and
    wherein a first light source is provided at one side below the input part to emit light to an edge of the power button part.

19. The terminal of claim 18, wherein a second light source is provided below the input part and the second input part, and a light guide is disposed at one side of the second light source, such that light is emitted to edges of the input part and the second input part.

20. The terminal of claim 1, wherein the penetration line is a penetration line in an T-like' shape formed along an edge of the case, and the penetration line comprises a first portion formed from the edge of the case toward an inner side of the case, and a second portion extending from the first portion and having an uneven interval from a side surface of the case.

21. The terminal of claim 20, wherein the input part comprises an upper input portion and a lower input portion formed by a first penetration line and a second penetration line, respectively, and
    wherein the second portions of the first penetration line and the second penetration line are spaced apart from each other.

22. A mobile terminal comprising:
    a terminal main body;
    a case covering the terminal main body and forming at least a part of an appearance of the terminal;
    a flexible printed circuit board disposed below the case and having a dome switch; and
    a printed circuit board disposed below the flexible printed circuit board and electrically connected to the flexible printed circuit board,
    wherein the case is provided with a penetration line formed through a partial area thereof to form a boundary, the penetration line defining an input part,
    wherein the dome switch is pressed in response to the input part being pressed, and
    wherein the case and the input part are spaced from each other by the penetration line, and the spacing is gradually increased toward an inner side thereof.

23. A mobile terminal comprising:
    a terminal main body; and
    a case covering the terminal main body and forming at least a part of an appearance of the terminal,
    wherein a partition line is formed through the case and convex along one direction, the partition line having both ends spaced apart from each other, wherein an input part is formed on an inner region of the partition line,
    wherein the input part is integrally formed with the case by a connection portion formed between both ends of the partition line, the input part being rotatable based on the connecting portion, and
    wherein the case and the input part are spaced from each other by the partition line, and the spacing is gradually increased toward an inner side thereof.

24. A mobile terminal comprising:
    a terminal main body; and
    a case covering the terminal main body and forming at least a part of an appearance of the terminal,
    wherein the case is divided into a first region formed by a partition line penetrating through the case and a line connecting both ends of the partition line, and a second region adjacent to the first region,
    wherein the case is provided with a connecting portion formed between the both ends of the partition lines, and an input part is formed on the first region, the input part being rotatable based on the connecting portion, and
    wherein the case and the input part are spaced from each other by the partition line, and the spacing is gradually increased toward an inner side thereof.

25. A mobile terminal comprising:
    a terminal main body; and
    a case covering the terminal main body and forming at least a part of an appearance of the terminal,
    wherein the case is provided with a partition line formed through the case along a predetermined path,
    wherein an input part is formed on a region formed by the partition line and a connecting portion formed between both ends of the partition line,
    wherein the input part is rotatable based on the connecting portion, and wherein the case and the input part are spaced from each other by the partition line, and the spacing is gradually increased toward an inner side thereof.

26. A method for forming a case of a mobile terminal comprising:

forming an input part in a manner of irradiating laser beam onto a case along a predetermined path, the case covering a terminal main body and forming at least part of appearance of the terminal; and coupling the case to the terminal body, wherein the coupling step is configured in such a manner that a flexible printed circuit board having a dome switch is formed below the case, and is electrically connected to a printed circuit board, and wherein surfaces of the case and the input part, facing each other, gradually get away from each other toward the inner side, by the irradiation of the laser beam.

27. The method of claim 26, wherein the forming of the input part is carried out in a manner of irradiating the laser beam from an inner side of the case by more than two times.

28. The method of claim 26, wherein the laser beam is irradiated in a manner that ends of the path is formed into a circular shape.

\* \* \* \* \*